United States Patent
Schiergl

(10) Patent No.: US 10,167,910 B2
(45) Date of Patent: Jan. 1, 2019

(54) METHOD FOR OPERATING A TRANSMISSION DEVICE FOR A MOTOR VEHICLE, AND CORRESPONDING TRANSMISSION DEVICE

(71) Applicant: AUDI AG, Ingolstadt (DE)

(72) Inventor: Andreas Schiergl, Schierling (DE)

(73) Assignee: AUDI AG, Ingolstadt (DE)

( * ) Notice: Subject to any disclaimer, the term of this patent is extended or adjusted under 35 U.S.C. 154(b) by 138 days.

(21) Appl. No.: 15/317,733

(22) PCT Filed: Jun. 9, 2015

(86) PCT No.: PCT/EP2015/001153
§ 371 (c)(1),
(2) Date: Dec. 9, 2016

(87) PCT Pub. No.: WO2015/188928
PCT Pub. Date: Dec. 17, 2015

(65) Prior Publication Data
US 2017/0130785 A1 May 11, 2017

(30) Foreign Application Priority Data
Jun. 14, 2014 (DE) .................. 10 2014 008 672

(51) Int. Cl.
*F16D 48/10* (2006.01)
*B60W 50/08* (2012.01)
(Continued)

(52) U.S. Cl.
CPC ....... *F16D 48/10* (2013.01); *B60W 30/18072* (2013.01); *B60W 50/087* (2013.01);
(Continued)

(58) Field of Classification Search
None
See application file for complete search history.

(56) References Cited

U.S. PATENT DOCUMENTS 4,140,031 A * 2/1979 Sibeud ............... F16H 61/0274
477/124
4,361,060 A * 11/1982 Smyth ................. B60W 10/02
477/120
(Continued)

FOREIGN PATENT DOCUMENTS

CN 102818012 A 12/2012
CN 103619685 A 3/2014
(Continued)

OTHER PUBLICATIONS

Notification of Transmittal of Translation of the International Preliminary Report on Patentability dated Dec. 15, 2016, in connection with corresponding international Application No. PCT/EP2015/001153 (5 pgs.).

*Primary Examiner* — Timothy Hannon
(74) *Attorney, Agent, or Firm* — Maier & Maier, PLLC

(57) ABSTRACT

A method for operating a transmission device for a motor vehicle, wherein the transmission device has an automatic clutch and a manual transmission. During one operation of the transmission device, the clutch is closed before a driving gear is engaged at the manual transmission if, when the clutch is at least partially open, actuation of the manual transmission is identified.

7 Claims, 1 Drawing Sheet

(51) Int. Cl.
  *B60W 30/18* (2012.01)
  *B60W 50/12* (2012.01)
  *F16H 63/46* (2006.01)
(52) U.S. Cl.
  CPC ............ *B60W 50/12* (2013.01); *F16H 63/46* (2013.01); *B60W 2030/1809* (2013.01); *B60W 2510/104* (2013.01); *B60W 2510/1015* (2013.01); *B60W 2540/16* (2013.01); *B60Y 2400/71* (2013.01); *F16D 2500/10412* (2013.01); *F16D 2500/30401* (2013.01); *F16D 2500/30806* (2013.01); *F16D 2500/30808* (2013.01); *F16D 2500/30816* (2013.01); *F16D 2500/30825* (2013.01); *F16D 2500/5085* (2013.01)

(56) References Cited

U.S. PATENT DOCUMENTS

| | | | | |
|---|---|---|---|---|
| 4,614,126 | A | * | 9/1986 | Edelen .................. F16H 3/12 74/333 |
| 4,676,115 | A | * | 6/1987 | Morscheck ............. F16H 3/12 74/339 |
| 4,683,996 | A | * | 8/1987 | Hattori .................. B60W 10/02 477/74 |
| 6,835,161 | B2 | * | 12/2004 | Grillenberger ........ B60W 10/02 477/77 |
| 2001/0023804 | A1 | * | 9/2001 | Nishimura .......... F16H 61/0403 192/3.55 |
| 2004/0138027 | A1 | | 7/2004 | Rustige et al. |
| 2008/0248922 | A1 | * | 10/2008 | Heinzelmann ........ B60W 10/02 477/109 |
| 2012/0137811 | A1 | * | 6/2012 | Lindner .................. F16H 61/22 74/473.11 |
| 2013/0116899 | A1 | * | 5/2013 | Iwao ...................... F02D 11/04 701/54 |

FOREIGN PATENT DOCUMENTS

| | | |
|---|---|---|
| DE | 19957917 A1 | 6/2000 |
| DE | 10221701 A1 | 11/2002 |
| DE | 102012223744 A1 | 6/2004 |
| DE | 102006040126 A1 | 3/2007 |
| DE | 102008042959 A1 | 4/2010 |
| DE | 102012208996 A1 | 12/2012 |
| EP | 0727597 A2 | 8/1996 |

* cited by examiner

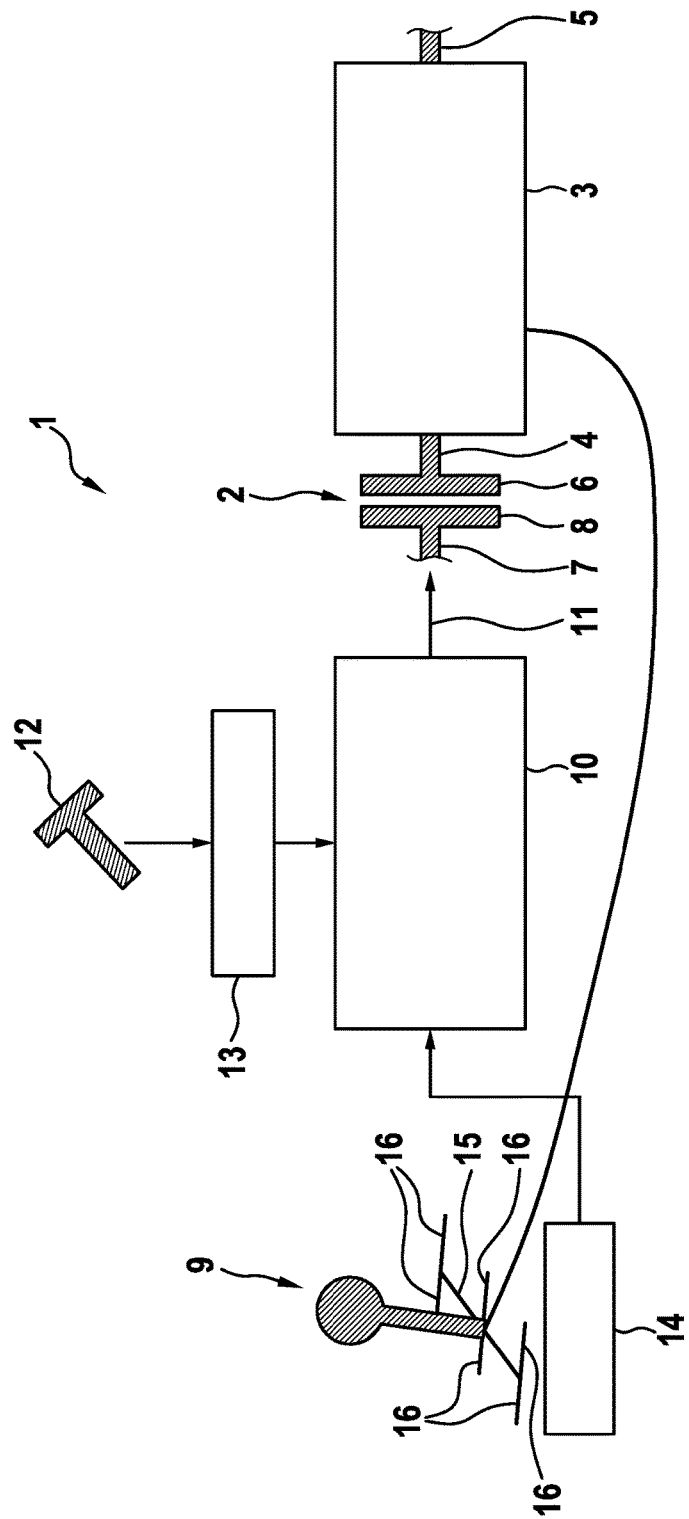

METHOD FOR OPERATING A TRANSMISSION DEVICE FOR A MOTOR VEHICLE, AND CORRESPONDING TRANSMISSION DEVICE

BACKGROUND

The invention relates to a method for operating a transmission device for a vehicle, wherein the transmission device is provided with an automatic clutch and with a manual shift transmission. The invention further relates also to a transmission device.

The transmission device preferably serves as a torque transmission within a powertrain of a vehicle. In this respect, the transmission device is arranged for example between a drive device of the vehicle and at least one drives axle of the vehicle. The drive device is provided with at least one drive unit, for example an internal combustion engine, or an electric machine. However, the drive device, can also be configured as a hybrid drive device as long as it has at least two drive units, which are preferably different from one another. For example, an internal combustion engine can be provided, as well as an electric machine, as drive units in a hybrid device.

The transmission device is equipped with an automatic clutch and with the manual transmission. The clutch is in this case in particular arranged in an operative connection between the drive device and the shift transmission, and it is in particular attached to at least one input shaft of the manual transmission or connected to it with an operative connection, in particular in a rigid and/or permanent manner. An output shaft of the shift transmission is preferably in an operative connection with at least one driven axle of the vehicle, in particular also in a rigid and/or permanent manner. This means that the rotational speed of the output shaft is directly dependent on the driving speed of the vehicle and vice versa.

The clutch serves in particular to select, create or interrupt the operative connection between the drive device and the shift transmission. As long as the clutch is closed, at least partially, or in particular fully, a torque created by the drive device is transmitted to the manual transmission. If the clutch is opened, in particular when it is fully opened, the operative connection is interrupted.

Accordingly, no torque is transmitted from the drive device to the transmission device, or vice versa. The clutch is designed as an automatic clutch and it is therefore actuated by means of an automatic positioning device. This means that the clutch is assigned an actuator, in particular an electric actuator that actuates the clutch.

Triggering of the actuator and thus also of the clutch occurs, for example, depending on the position of the clutch pedal and/or on a value preset in a control device. The clutch can be controlled in this respect both by a driver of the vehicle—by means of the clutch pedal—as well as by a control device of the vehicle, or the drive device can be controlled in this manner. The clutch is coupled only electrically, but not mechanically, with the clutch pedal. It goes without saying that any clutch operating element can be provided instead of the clutch pedal. The manual transmission is designed as a manual transmission, and an operating element, for example a shift lever, is assigned to it by means of which the driver of the vehicle can actuate the manual transmission, for example to set a desired driving gear.

From prior art is known for example document DE 102 21 701 A1. This document relates to a control method for motor vehicles provided with an automatic clutch device having a motor that can be controlled with a motor controlling device, preferably a controllable automatic transmission, and at least one electronic controlling device for controlling the transmission and the clutch device. In this case, the clutch is closed when the brakes are actuated and/or during an actuation of the fuel metering element, wherein prior to the closing of the clutch in order to end the coasting mode, the rotational speed of the drive shaft of the transmission or a corresponding variable representing this rotational speed is detected and the number of rotations is controlled in such a way that both rotational speeds coincide or are matched.

Furthermore, document DE 10 2012 208 996 A1 indicates a method and a device for controlling how the clutch of a motor vehicle is controlled in such a way so that when for example a gear ratio of a manual transmission is selected to be engaged that is currently not suitable, the engagement of the clutch is blocked.

SUMMARY OF THE DISCLOSURE

The object of this invention is to provide a method for operating a transmission device that has advantages over known methods, in particular as it enables a more reliable operation of the transmission device.

This is achieved with the features of claim 1 according to the invention. In this case, at least one operating mode is provided, wherein the transmission device closes the clutch prior to the engagement or disengagement of a travel gear in the manual transmission, so that it is then opened again after a certain period of time after the closing when actuation of the manual transmission is detected with at least a partially opened clutch and the engaging or disengaging of the travel gear is prevented. The at least one operating mode is preferably an operating mode in which the clutch is at least temporarily opened, in particular fully opened. A travel gear can be set in the manual transmission, in particular to idle position or neutral position. Preferably, several forward travel gears and one reverse gear of the manual transmission are realized, in particular exactly one reverse gear.

During the normal mode of operations of the transmission device in which a torque generated by the vehicle is to be used to drive the motor vehicle, the clutch is opened in order to carry out gear changing. After that, a desired travel gear is engaged and the clutch is again closed in order to create the operative connection between the drive and the at least one driven axle of the motor vehicle. If a driving gear has already been engaged in the manual transmission that does not correspond to the desired drive, the previous driving gear is first disengaged and the desired driving gear is engaged only then. After that, the clutch is closed as described.

In contrast to this, the clutch should under certain conditions already be closed before a driving gear is engaged. Of course, it is also possible that under the same conditions, the clutch will be already closed before a driving gear is disengaged, which is to say before the actuation of the manual transmission in fact takes place.

The closing of the clutch before the driving gear is engaged and/or disengaged should take place when actuation of the manual transmission is detected with at least a partially opened clutch. As was already explained, opening of the clutch that is as complete as possible can be provided in the operating mode. It is preferred when in the operating mode, coasting of the vehicle is realized, so that the operating mode is provided as the coasting operating mode. However, as was already explained above, the number of the rotations of the output shaft of the manual transmission depends on the momentary driving speed of the vehicle. Because with an at least partially opened clutch, in particular with a fully opened clutch, the actuation of the transmission, which is to say disengagement or engagement of a driving gear, requires only a small force, this can result in an unintended actuation of the transmission, for example when the driver accidentally pushes against the gear lever. Such an actuation can also be caused by an intentional, for example abusive, operation of the gear lever.

If a driving gear is now engaged, the output shaft of the transmission will be operatively connected via a corresponding drive ratio with the input shaft of the transmission. Accordingly, the input shaft will be brought to a rotational speed that corresponds to the rotational speed of the output shaft and the transmission ratio of the driving gear. If the transmission ratio is too high, the number of the rotations of the input shaft will be very high. In an extreme case, the number of the rotations of the input shaft will be higher than the maximum allowable speed. In this case, damage can occur, for example breaking of a shaft clutch disk that is operationally connected with the input shaft.

In order to prevent this, the clutch is at least partially, in particular fully closed as soon as actuation of the transmission is detected. If the clutch is at least partially closed, the actuation of the transmission, which is to say disengagement or engagement of the driving gear, is rendered much more difficult, in particular due to the undercut of the clutch teeth of the clutch. An unintentional operation of the transmission, in particular through the gear lever, by the driver or in another manner is therefore prevented with the procedure described above, or at least made more difficult.

In addition, another feature is that the clutch is then opened again after a certain period of time after the closing. This is also preferred in the case when coasting is the mode of operation. The clutch will thus preferably be closed only during a certain period of time. The time period is here determined so that actuation of the transmission is prevented. The predetermined time period can be in this case defined so as to realize a smooth engagement and/or disengagement depending on the driving speed of the motor vehicle or on the number of the rotations of the input shaft. With higher traveling speeds or higher rotations of the input shaft, a longer time period is selected than with lower traveling speeds or lower rotations.

In a further embodiment of the invention, the actuation is the engagement or disengagement of a driving gear. Such an approach has already been discussed above. It is particularly advantageous when the engagement of a driving gear is prevented, while the engagement must be at least inhibited. It is for example possible in principle not to allow the engagement of any driving gear. However, it goes without saying that it is also possible not to allow selectively at least one driving gear, for example because it results in a transmission ratio that is too high.

According to a further embodiment of the invention, the clutch is closed only if engagement of a driving gear is detected, which results in a transmission ratio that is higher than the maximum transmission ration. This was also already pointed out. In particular it is important to prevent the occurrence of a rotational speed of the input shaft of the manual transmission that is too high, which is to say for example exceeding a maximum number of rotations of the input shaft.

According to yet another preferred embodiment of the invention, the maximum transmission ratio is determined from a rotational speed of the output shaft and a maximum input shaft rotational speed of the manual transmission. The rotational speed of the output shaft is directly dependent, as was already mentioned, on the driving speed of the vehicle because the output shaft of the manual transmission is preferably rigidly and/or permanently connected with an operational connection with at least one driven axle of the motor vehicle. Also, the maximum rotational speed of the input shaft, which represents the maximum permissible rotational speed of the input shaft, is known. The maximum transmission ratio, which may not exceed the speed to be engaged, is then determined from both of these variables in order to maintain the rotational speed limit for the input shaft of the manual transmission.

In addition or as an alternative, it can be also provided that the closing of the clutch is carried out only when the rotational speed of the output shaft is higher than a limiting rotational speed. Therefore, the clutch should not be closed at a lower driving speed of the vehicle because it is assumed that in any case, a rotational speed of the input shaft that exceeds the maximum rotational speed cannot occur. In particular, at least one mode of operation will not be activated when the rotational speed of the output shaft is lower than the limiting rotational speed. Accordingly, the operational mode will be carried out only when the rotational speed of the output shaft is above the limiting rotational speed.

According to another embodiment in accordance with the invention, it is provided that the coasting mode is used as the operational mode. In the coasting mode, the drive device is not used or not required to drive the motor vehicle. This can be the case for example when external influences, such as the influence of gravity, are sufficient to ensure a desired driving speed. This is in particular the case when the incline of the around on which the vehicle is located exceeds a certain inclination and the motor vehicle is positioned inclined downhill in the direction of the travel. In the coasting operation mode, the automatic clutch is controlled in such a way that it is subsequently opened, in particular fully opened. Furthermore, the drive device can be switched off or at least put in the idle mode, in which it is for example operated only with idle rotations.

According to another preferred embodiment of the invention, the clutch is opened when the operational mode of the clutch is initiated. This is in particular the case when the coasting mode is used as the operational mode. This means that the coasting mode of operations is initiated for example by a control device of the motor vehicle, wherein the clutch is opened at the same time or at least immediately after the operational mode has been initiated, in particular fully opened.

Finally, it can be also provided that a neutral gear sensor or an all gear sensor is employed in order to detect the activation of the transmission. Such a sensor is preferably provided in any case when the transmission device—as is the case here—is equipped with the automatic clutch and the manual transmission. The neutral gear sensor detects in particular when the manual transmission or the shift lever is arranged in the neutral gear, or in the position of idle operations.

The all gear sensor, on the other hand, detects engagement and/or disengagement of specific driving gears.

While with the neutral gear sensor can only generally determine that a gear has been engaged or disengaged, the all gear sensor can also additionally supply the information about to which driving gear is this applied. Preferably, both the neutral drive sensor and the all drive sensor are designed in such a way that they make it possible to detect engagement or disengagement already at the beginning, when the drive has in fact not yet been engaged or disengaged at that point in time. The neutral drive sensor or the all drive sensor is thus arranged or equipped in such a manner that it detects early on an actuation of the manual transmission so that by closing the clutch, the actual disengagement of the driving gear or at least the engagement of the driving gear can be prevented.

The invention further also relates to a transmission device for a motor vehicle, in particular for carrying out the method according to the preceding embodiments, wherein the transmission device is configured with an automatic clutch and manual transmission. At the same time, the transmission device is designed so that at least one operation type of the transmission device allows to close the clutch before the engagement or disengagement of a driving gear and then to open it again after a certain period of time after the closing, when with at least a partially opened clutch, actuation of the manual transmission is detected so that engagement or disengagement of the driving gear is prevented. The advantages of such an approach or such a configuration of the transmission design have already been mentioned. To the extent that both the method and the transmission device can be further developed in accordance with the embodiments above, reference is made to them as well.

BRIEF DESCRIPTION OF THE DRAWINGS

The invention will now be described in detail based on the embodiments shown in the FIGURE, without limiting the invention in this manner. The FIGURE shows the following.

FIGURE—a schematic illustration of a transmission device for a motor vehicle.

DETAILED DESCRIPTION OF THE DRAWINGS

The FIGURE shows a schematic illustration of a transmission device 1, such as for example a transmission device that is used for a motor vehicle. In this case, the transmission device 1 is preferably provided so that it has an operative connection with at least one drive unit, such as at least one driven axle of the motor vehicle. The transmission device 1 has at least one automatic clutch 2, as well as a manual shift transmission 3. The manual transmission 3 is equipped with an input shaft 4 and with an output shaft 5. A driving gear can be installed at the manual transmission, which can be set to a plurality of driving gears, for example several forward driving gears, as well as one reverse gear. The driving gear corresponds to a transmission ratio between the input shaft 4 and the output shaft 5.

The input shaft 4 of the manual transmission 3 is operatively directly and rigidly connected with the clutch 2, in particular with a clutch disk 6. On the other hand, it is preferred when the output shaft 5 is rigidly and/or permanently operatively connected with at least one of the driven axles of the motor vehicle and thus also with the wheels of the motor vehicle. This means that the output shaft 5 has a rotational speed that corresponds to the driving speed of the vehicle. The rotational speed of the input shaft 4 and thus also of the clutch disk 6 can be ascertained in this respect from the rotational speed of the output shaft 5, as well as from the transmission ratio set at the manual transmission 3 or the corresponding driving gear. Of course, the manual transmission 3 can be also in the neutral position or idle operation position, in which the operative connection between the input shaft 4 and the output shaft 5 is interrupted.

On the side that is facing away from the manual transmission 3, the clutch 2 is operationally connected, or can be operationally connected, through a drive shaft 7 with the drive device. The drive shaft 7 is connected through a second clutch disk 8 with the clutch 2. With a corresponding mutual arrangement of the clutch disks 6 and 8, a torque transmission connection can be created between the drive shaft 7 and the input shaft 4 of the manual transmission 3. With a fully opened clutch 2, no torque will be transmitted between the drive clutch 7 and the input shaft 4. Of course, any intermediate positions of the clutch 2 can be also realized, in which the torque will be transmitted only partially. The clutch is in this case opened only partially.

A driving operation with respect to the activation of the manual transmission can be carried out by means of an operating element 9, for example a shift lever. The operating element 9 is preferably arranged in such a way so that it can be operated by a driver of the vehicle. The clutch 2, on the other hand, is controlled by using a control device 10. This control is here schematically indicated by the arrow 11. The control of the clutch 2 should be performed for example in dependence on the position of a clutch pedal 12 or of a corresponding operating element. For this purpose, the clutch pedal 12 is associated with a clutch pedal sensor 13, which detects the position of the clutch pedal 12 and supplies the input variable to the control device 10.

With the operating element 9, for example a shift lever, is associated a sensor element 14. This element is realized for example as a neutral gear sensor, or as an all gear sensor. With the neutral sensor it is possible to determine whether the operating element 9 is located in the neutral gear gate 15, which is only suggested here, of the operating element 9, or whether the operating element 9 is displaced from it in the direction of the neutral gear 15. The all gear sensor can in addition also determine in which switching position is present the operating element 9, or from which switching position the operation element is displaced, or in which switching position it is placed. Switching position 16 is indicated here merely by way of an example. It goes without saying that in principle any number of switching positions 15 may be present, wherein each of the switching positions corresponds to a driving gear of the manual transmission and thus also to a transmission ratio. By using the sensor element 14, it is also possible to provide a summary indicating whether activation of the manual transmission 3 takes places, or whether such an activation can be detected.

During the operation of the transmission device 1, it is now expected that with at least one operation type of the transmission device 1, the clutch will be closed before the activation of a driving gear at the manual transmission 3 when engagement of the manual transmission 3 is detected with at least a partially opened clutch 2. In this manner, engagement of the driving gear and/or disengagement of the driving gear is already prevented, or at least rendered more difficult, when changing a gear could possibly lead to problems. This could be a result of the fact that a driving gear is to be engaged, which is provided with a transmission ratio that is larger than a maximum transmission ratio. As was already mentioned above, the rotational speed of the input shaft depends on the rotational speed of the output shaft 5 and on the existing transmission ratio or the present transmission ratio relationship. If this ratio is too large, the rotational speed of the input shaft will be much higher than that of the output shaft 5. Accordingly, a higher rotational speed of the output shaft 5 may result in exceeding the maximum rotational speed allowable at the input shaft 4 and depending on the conditions, this may result in damage to the transmission device 1, in particular to the clutch disk 6.

With a timely closing of the clutch 2, which is carried out only partially, or preferably fully, the disengagement or engagement of the driving gear can be prevented, or at least indicated to the driver of the vehicle. The latter is the case because with a closed clutch 2, disengagement and engagement of a driving gear often leads to noises of the manual transmission 3. The procedure described above is used in particular if the coasting operation mode is employed in which the coasting operation of the motor vehicle is to be used. In this case, the clutch 2 is preferably at least temporarily fully opened so as not to be in the way of an operation of the motor vehicle performed in another manner than by means of the drive device.

The invention claimed is:

1. A method for operating a drive device for a motor vehicle, comprising:
   detecting an actuation of a manual transmission of a transmission device while an automatic clutch is in an at least partially opened state;
   closing the automatic clutch of the transmission device of the motor vehicle on detection of the actuation before an engagement or disengagement of a driving gear at the manual transmission so that the engagement or disengagement of the driving gear is prevented; and
   opening the automatic clutch a predetermined time after detecting the actuation of the manual transmission.

2. The method according to claim 1, wherein the automatic clutch is closed only when the engagement of the driving gear is detected, which requires a transmission ratio that is greater than a maximum transmission ratio.

3. The method according to claim 2, wherein the maximum transmission ratio is determined from an output shaft rotational speed and from a maximum input shaft rotational speed of the manual transmission.

4. The method according to claim 1, wherein the closing of the automatic clutch is carried out only when a rotational speed of an output shaft is greater than a limiting rotational speed.

5. The method according to claim 1, wherein an operating mode is a coasting operating mode.

6. The method according to claim 5, wherein the automatic clutch is opened with an engagement of the operating mode.

7. The method according to claim 1, wherein a neutral gear sensor or an all gear sensor is used to detect an actuation of the manual transmission.

\* \* \* \* \*